United States Patent Office 2,870,213
Patented Jan. 20, 1959

---

2,870,213

DIFLUOROCHLOROACETALDEHYDE AND PROCESS

Cyril Woolf, Morristown, N. J., assignor to Allied Chemical Corporation, a corporation of New York No Drawing. Application May 20, 1957
Serial No. 660,070

5 Claims. (Cl. 260—601)

This invention is directed to difluorochloroacetaldehyde, $CClF_2.CHO$, and to processes for making the same.

More particularly from process viewpoint, the invention relates to preparation of difluorochloroacetaldehyde by catalytic gas-phase reaction of difluorochloroacetyl chloride, $CClF_2.COCl$, and hydrogen. Catalytic reduction of acid chlorides to aldehydes has been suggested. Prior proposals have been directed to reduction of aliphatic acid chlorides which do not contain chlorine other than that present in the —COCl group. Difluorochloroacetyl chloride, the organic starting material employed in practice of the present invention, contains chlorine in the alkyl radical. Experience with chlorine containing compounds would indicate that hydrogen reduction would involve elimination of the chemically bound chlorine in the alkyl group. For example, hydrogen reduction of trichloroacetyl chloride in the presence of a supported palladium catalyst has resulted in $CHCl_2.COCl$ as a reaction product, thus indicating that alkyl chlorine of difluorochloroacetyl chloride would be attacked and eliminated as HCl in reactions of the type to which the invention relates.

This invention is based on the discovery that by use of a certain organic starting material, namely difluorochloroacetyl chloride, and certain reaction conditions, alkyl chlorine of the acid chloride starting material is not attacked, contrary to what would be expected, and that it thus becomes possible to make difluorochloroacetaldehyde, a new product, from difluorochloroacetyl chloride and hydrogen by an easily controllable catalytic gas-phase reaction without loss of alkyl chlorine. Hence, the invention comprises the selection of a certain chlorofluorocarbon starting material, and the discovery of particular catalysts and catalytic reaction conditions, which factors of starting material, catalysts and reaction conditions conjunctively afford accomplishment of the invention objectives. Hence, it has been found that when difluorochloroacetyl chloride is subjected to the action of hydrogen at certain relatively low elevated temperatures and while in the presence of certain catalysts, no significant attack on the alkyl chlorine of the starting material is effected, and difluorochloroacetaldehyde is obtained in yields substantially improved over the prior art.

Difluorochloroacetyl chloride, a known compound, is a colorless liquid boiling at 24.8° C. The process of the invention may be represented theoretically by $$CClF_2.COCl + H_2 \rightarrow CClF_2.CHO + HCl$$

An important feature of the invention is the nature of the catalytic material employed and the composition thereof. This catalyst consists of palladium supported on activated carbon. It has been found that the catalysts described afford two marked advantages, namely, facilitate use of low reaction temperatures, and effect high yield of sought-for product. With regard to preparation of the catalyst, a water-soluble palladium salt which is capable of reduction to elemental palladium by hydrogen may be employed. Readily available palladium chloride is preferred. Any of the commercial activated carbons may be used, e. g. Columbia 6G carbon, Columbia SW carbon, or Darco carbon. If desirable, the activated carbon may be treated preliminarily to remove any silica by leaching with aqueous HF, water washing, and drying. The granular, activated carbon support may be immersed in an aqueous solution of palladium chloride. The carbon carrying absorbed palladium chloride is separated from the water and preliminarily dried at about 120° C. The catalyst may then be heated at temperatures of say 150–300° C. in a stream of hydrogen to eliminate water and reduce the palladium salt to elemental palladium. The amounts of palladium employed may be such that the finished palladium on activated carbon catalyst contains substantially in the range of 0.1–10.0 weight percent of palladium based on the weight of carbon. The preferred range of palladium concentration, to obtain optimum results, lies substantially in the range of about 0.5–1.5 weight percent of Pd.

Practice of the invention procedurally comprises passing a gas-phase mixture of difluorochloroacetyl chloride and hydrogen thru a reaction zone containing the catalyst indicated and maintained at relatively low elevated temperatures, and recovering difluorochloroacetaldehyde from the reaction zone exit. Apparatus may comprise preferably a tubular reactor, made of nickel or other suitable material such as Inconel, Monel and stainless steel, mounted in a furnace provided with means for maintaining the reaction zone in the reactor at the desired elevated internal temperature. The reactor may include inlets for introduction of controlled amounts of hydrogen and vaporous difluorochloroacetyl chloride, and may be provided with a reaction product exit connected to a conventional product recovery system.

Significant reaction and formation of $CClF_2.CHO$ are effected at temperatures as low as about 110° C. It has been found that the properties of catalysts described are such that reaction temperatures need not exceed about 200–210° C., thus affording the advantages of avoiding side reactions, decarbonylation and over reduction, indications being that the high yields obtained are attributable to low temperatures which in turn appear to be attributable to the properties of the catalysts. Preferred temperatures lie in the range of about 140–200° C., and in some circumstances, optimum operating temperatures lie in the range of about 140–180° C.

Hydrogen may be employed in any quantity sufficient to react with a significant amount of the $CClF_2.COCl$ starting material. Stoichiometric amounts of reactants are in a 1:1 molar ratio. Ordinarily, it is undesirable to use hydrogen in quantity appreciably more than 1.5 mols of hydrogen per mol of $CClF_2.COCl$, preferred quantities of hydrogen lying substantially in the range of 0.75–1.5 mols per mol of $CClF_2.COCl$.

Reaction or contact time necessary to effect the desired percentage of reaction is dependent to some extent upon temperature and catalyst concentration. Thus increasing temperature and catalyst concentration with respect to palladium facilitate shorter contact time, and vice versa. Contact time may lie in the range of 2–30 seconds, preferably 5–15 seconds. For any given set of operating conditions, optimum contact time may be determined by test run.

Products exiting the reaction zone consist of the sought-for product $CClF_2.CHO$ and hydrogen chloride, together with unreacted $CClF_2.COCl$ and hydrogen. The organic portion of the reactor exit may be isolated by suitable cooling, such as in Dry-Ice acetone traps. By this procedure, unreacted hydrogen and a major part of the HCl by-product pass thru the traps while $CClF_2.CHO$ and unreacted $CClF_2.COCl$ are obtained as condensate in the traps. The CClF$_2$.CHO product may be recovered from the condensate by fractional distillation.

Following is an example of practice of the invention. For preparation of the palladium catalyst, 14 mesh Columbia 6G activated carbon was mixed with an aqueous palladium chloride solution in quantity such that 0.5 part by weight, calculated as elemental palladium, was present for each 100 parts of carbon. Hence, 0.85 g. of PdCl$_2$ (17 g. of 5 w./w. percent palladium chloride solution), were added to 100 g. of carbon. The requisite quantity of 5 w./w. percent PdCl$_2$ solution was diluted to 150 ml. with water before adding the carbon. After standing for two hours with occasional shaking, the impregnated carbon was decanted and oven-dried at 120° C. 150 ml. of the catalyst were charged into a one-inch I. D. tubular nickel reactor heated externally over 36 inches of length by an electric furnace provided with automatic temperature control. The catalyst was disposed in a central 12 inch long length of the reactor. Reactor temperature, as measured by an internally disposed thermocouple, was raised to 300° C. and maintained at this temperature for two hours while passing hydrogen at the rate of 12 liters/hour. This procedure completed the drying of the catalyst and reduced the PdCl$_2$ to Pd.

Reaction zone temperature was lowered to about 150° C. During 12 hours, 913 g. of CClF$_2$.COCl (6.12 moles) and 231 liters of hydrogen (9.65 moles) were passed simultaneously, at about constant rate, through the reactor. Reaction was moderately exothermic, and temperature was maintained at about 150–160° C. throughout the run. Exit products from the reactor were passed through a glass flask cooled by acetone/Dry-Ice. Residual hydrogen and HCl discharged from the flask were water scrubbed, and unreacted hydrogen, as measured by a wet gas-meter, amounted to 120 liters, 5.2 mols. The material trapped in the acetone/Dry-Ice cooled flask was fractionally distilled at atmospheric pressure using an acetone/Dry-Ice cooled still head to provide appropriate reflux, the still being protected against the entry of water by Drierite. Dissolved HCl was disengaged first and discharged through the associated water srubber. A total of 5.20 mols of chloride ion was found by titration in the scrub water. After disengagement of HCl, a first fraction of 525 g. boiling substantially within the range of about 18–30° C. was obtained leaving a first still residue of about 130 g. The first fraction was redistilled and there was recovered a second fraction of 355 g. identified by analysis to be CClF$_2$.CHO having a boiling point of 17.8° C., and a second still residue of 162 g. The first still residue was redistilled, and there was recovered a third fraction of 53 g. of CClF$_2$.CHO having a boiling point of 17.8° C., affording a total of 408 g. of recovered CClF$_2$.CHO in liquid form. On the basis of the CClF$_2$.COCl starting material which had reacted, yield of CClF$_2$.CHO monomer in liquid form at this point was about 69%. The foregoing second still residue of 162 g. solidified on cooling as solid CClF$_2$.CHO polymer which formed because the crude reaction product constituting the still residue had been allowed to stand overnight while saturated with HCl. Ice-water was added to the solid material in amount more than enough to hydrolyze any unreacted CClF$_2$.COCl present, and such CClF$_2$.COCl hydrolyzed to CClF$_2$.COOH. The CClF$_2$.CHO polymer form is not reactive with water. Hence, the CClF$_2$CHO polymer material was separated from the water solution of CClF$_2$.COOH, and there was recovered a white solid which, after washing and drying at 40° C., weighed about 110 g. On strong heating to temperature of about 180° C., the white solid material vaporized and on condensation was recovered as the CClF$_2$.CHO monomer in liquid form having the 17.8° C. boiling point. On the basis of the CClF$_2$.COCl starting material which had reacted, the combined yield of recovered CClF$_2$.CHO monomer and polymer (depolymerized to the CClF$_2$.CHO monomer as described), was about 87%.

The CClF$_2$.CHO product of the invention is useful as a starting material in various organic synthesis processes. The difluoroacetaldehyde, extremely soluble in water, has been found to react exothermically with water to form a stable, distillable hydrate having a boiling point of about 104–106° C. Hence, the monomeric aldehyde is a strong dehydrating agent. For example, CCl$_2$.CHO may be employed to dehydrate aqueous solutions of CClF$_2$.COOH by passing the aldehyde into the aqueous acid solution, and distilling off the water as the aldehyde hydrate. To further illustrate, in an operation in which a CClF$_2$.COCl-hydrogen reaction was carried out similarly as in the above example, during about 10¼ hrs. 1170 g. of CClF$_2$.COCl (7.8 mols) and 10.25 mols of hydrogen were passed simultaneously, at about constant rate, thru a reactor packed with the palladium-on-activated carbon catalyst, both reactor and catalyst being substantially as described above. Reaction temperature was about 170–180° C. throughout the run. About 5.5 mols of hydrogen were consumed. The reactor exit, i. e. CClF$_2$.CHO, HCl, and unreacted CClF$_2$.COCl and hydrogen, were passed into about 160 g. of water held at about 30–40° C. It will be understood that on introduction into water, unreacted CClF$_2$.COCl hydrolyzed to CClF$_2$.COOH. The liquor thus formed was distilled. A first fraction, boiling up to approximately 100–102° C. and containing HCl and CClF$_2$.CHO not needed to tie up with water present, was taken off. On cooling and condensation of this fraction, about 221 g. of CClF$_2$.CHO were recovered as liquid, the substantially anhydrous HCl remaining in the gas phase and passing off as such. On continued distillation of the liquor remaining in the still, there was recovered as a second fraction about 435 g. of difluorochloroacetaldehyde hydrate having a boiling point of about 104–106° C. Thereafter, there was recovered as a third fraction about 65 g. of liquid intermediate having a boiling point of about 106–120° C., and a final fraction comprising about 188 g. of substantially anhydrous CClF$_2$.COOH boiling in the range of about 120–122° C. The second fraction removed substantially all the water from the system. The foregoing shows that the affinity of the CClF$_2$.CHO was so strong as to disassociate water from both the HCl and from the CClF$_2$.COOH, and to effect removal of HCl as substantially anhydrous HCl, and subsequent recovery of substantially anhydrous CClF$_2$.COOH from its aqueous solution. Further, in view of the 17.8° C. boiling point of CClF$_2$.CHO coupled with its high dehydrating properties, it has been found that gases containing water may be dehydrated in the gas-phase by treatment thereof with suitable quantities of CClF$_2$.CHO at temperatures suitably above the boiling point of CClF$_2$.CHO and below the 104–106° C. boiling point of the aldehyde dihydrate. In such circumstances, water is separated out of the gas undergoing treatment as the hydrate constituent of the condensed and liquefied difluorochloroacetaldehyde hydrate.

I claim:

1. The process for making CClF$_2$.CHO which comprises subjecting gaseous CClF$_2$.COCl to the action of a reactive quantity of hydrogen while maintaining temperature substantially in the range of 110–210° C., and while in the presence of palladium-activated carbon catalyst; and recovering CClF$_2$.CHO from the resulting reaction product.

2. The process of claim 1 in which temperature is substantially in the range of 140–180° C.

3. The process for making CClF$_2$.CHO which comprises subjecting gaseous CClF$_2$.COCl to the action of a reactive quantity of hydrogen, said quantity being not substantially more than 1.5 molecular proportions of hydrogen per mol of CClF$_2$.COCl while maintaining temperature substantially in the range of 110–210° C., and while in the presence of a palladium on activated carbon catalyst containing not more than about 10% by weight of palladium; and recovering $CClF_2.CHO$ from the resulting reaction product.

4. The process for making $CClF_2.CHO$ which comprises subjecting gaseous $CClF_2COCl$ to the action of hydrogen in amount substantially in the range of 0.75–1.5 mols per mol of $CClF_2.COCl$ while maintaining temperature substantially in the range of 140–180° C., and while in the presence of a palladium on activated carbon catalyst containing about 0.5–1.5% by weight of palladium, and recovering $CClF_2.CHO$ from the resulting reaction product.

5. Difluorochloroacetaldehyde, $CClF_2.CHO$.

References Cited in the file of this patent

Adams et al.: Organic Reactions, vol. IV, pp. 363–372 (1948).

Husted et al.: J. Am. Chem. Soc., vol. 74, pp. 5422–5426 (1952).